(12) United States Patent
Manber

(10) Patent No.: US 10,515,377 B1
(45) Date of Patent: Dec. 24, 2019

(54) USER STUDIES USING INTERACTIVE DEVICES

(71) Applicant: Verily Life Sciences LLC, Mountain View, CA (US)

(72) Inventor: Udi Manber, Los Altos Hills, CA (US)

(73) Assignee: Verily Life Sciences LLC, Mountain View, CA (US)

( * ) Notice: Subject to any disclaimer, the term of this patent is extended or adjusted under 35 U.S.C. 154(b) by 504 days.

(21) Appl. No.: 13/887,023

(22) Filed: May 3, 2013

Related U.S. Application Data

(60) Provisional application No. 61/785,948, filed on Mar. 14, 2013.

(51) Int. Cl.
*G06Q 30/02* (2012.01)

(52) U.S. Cl.
CPC ................. *G06Q 30/0201* (2013.01)

(58) Field of Classification Search
CPC .......................... G06Q 10/00–30/00
USPC .................................. 705/7.11–7.42
See application file for complete search history.

(56) References Cited

U.S. PATENT DOCUMENTS

| | | | | |
|---|---|---|---|---|
| 6,070,145 | A * | 5/2000 | Pinsley et al. ............... | 705/7.32 |
| 6,144,991 | A * | 11/2000 | England ............ | G06F 17/30873 707/E17.111 |
| 6,711,414 | B1 * | 3/2004 | Lightman .............. | G06Q 30/02 340/853.2 |
| 6,757,719 | B1 * | 6/2004 | Lightman ............ | G06Q 20/383 455/419 |
| 6,778,807 | B1 * | 8/2004 | Martino et al. ............... | 434/362 |
| 9,015,245 | B1 * | 4/2015 | Lee ................... | H04L 29/06476 709/203 |
| 9,256,071 | B1 * | 2/2016 | Spitzer ................. | G02B 27/017 |
| 2002/0026390 | A1 * | 2/2002 | Ulenas et al. ................... | 705/27 |
| 2002/0052778 | A1 * | 5/2002 | Murphy et al. ................. | 705/14 |
| 2003/0123027 | A1 * | 7/2003 | Amir ...................... | A61B 3/113 351/209 |
| 2004/0117239 | A1 * | 6/2004 | Mittal et al. .................... | 705/10 |
| 2004/0177002 | A1 * | 9/2004 | Abelow ............ | G06Q 10/0639 705/14.19 |
| 2006/0064342 | A1 * | 3/2006 | Frengut et al. ................. | 705/10 |

(Continued)

OTHER PUBLICATIONS

Ellen Belnder, Adventures in remote usability, Part 1: Why remote? [online], [retrieved on May 2, 2013]. Retrieved from the Internet <URL: http://www.ellenbeldner.info/2010/06/remote_usability_Part_1_why_remote.html>.

(Continued)

*Primary Examiner* — Patricia H Munson
*Assistant Examiner* — Sarjit S Bains
(74) *Attorney, Agent, or Firm* — Perkins Coie LLP

(57) ABSTRACT

Methods, systems, and apparatus, including computer programs encoded on computer storage media, for conducting user studies. One of the methods includes receiving a user study session request from a sponsor, wherein the user study session request identifies a product and one or more criteria. Session volunteer data identifying one or more available session volunteers having access to the product and one or more attributes is received. A session volunteer that satisfies the user study session request is determined, including matching the one or more attributes of the session volunteer to the one or more criteria of the session request. A session between the sponsor and the session volunteer is initiated.

16 Claims, 3 Drawing Sheets

(56) References Cited

U.S. PATENT DOCUMENTS

| | | | | |
|---|---|---|---|---|
| 2007/0043632 | A1* | 2/2007 | Abelow | G06Q 10/101 |
| | | | | 705/26.8 |
| 2007/0121065 | A1* | 5/2007 | Cox | A61B 3/113 |
| | | | | 351/209 |
| 2007/0236502 | A1* | 10/2007 | Huang | G06T 19/00 |
| | | | | 345/473 |
| 2008/0162261 | A1* | 7/2008 | Velazquez | G06Q 30/02 |
| | | | | 715/757 |
| 2009/0189981 | A1* | 7/2009 | Siann | H04N 7/183 |
| | | | | 348/143 |
| 2009/0254457 | A1* | 10/2009 | Folsom | G06Q 30/0601 |
| | | | | 705/26.1 |
| 2009/0326709 | A1* | 12/2009 | Hooper | G06F 17/30011 |
| | | | | 700/245 |
| 2010/0037151 | A1* | 2/2010 | Ackerman | G06Q 10/10 |
| | | | | 715/753 |
| 2010/0118158 | A1* | 5/2010 | Boland | H04N 5/23203 |
| | | | | 348/211.2 |
| 2012/0063736 | A1* | 3/2012 | Simmons | H04N 21/4788 |
| | | | | 386/224 |
| 2012/0120214 | A1* | 5/2012 | Faranda | G06Q 30/02 |
| | | | | 348/61 |
| 2013/0283307 | A1* | 10/2013 | Avedissian | G06Q 30/0214 |
| | | | | 725/23 |
| 2013/0293530 | A1* | 11/2013 | Perez | G06K 9/00671 |
| | | | | 345/418 |
| 2014/0057238 | A1* | 2/2014 | Okamoto | G09B 5/06 |
| | | | | 434/308 |
| 2014/0160248 | A1* | 6/2014 | Pomerantz | G06F 1/163 |
| | | | | 348/47 |

OTHER PUBLICATIONS

Lindsey M., A Practical Guide: How to Interview and Observe Customers Remotely [online], [retrieved on May 2, 2013]. Retrieved from the Internet <URL: http://remoteresear.ch/a-practical-guide-how-to-interview-and-observe-customers-remotely/>.

Nate Bolt, Mobile Remote Testing with Reflection [online], [retrieved on May 12, 2013]. Retrieved from the Internet <URL: http://remoteresear.ch/reflection/>.

Ethnio, What is Remote Usability Research? [online], [retrieved on May 2, 2013]. Retrieved from the Internet <URL: http://remoteresear.ch/what-is-remote-usability-research/>.

* cited by examiner

USER STUDIES USING INTERACTIVE DEVICES

CROSS-REFERENCE TO RELATED APPLICATIONS

This application claims the benefit under 35 U.S.C. § 119(e) of the filing date of U.S. Provisional Patent Application No. 61/785,948, filed on Mar. 14, 2013, entitled "User Studies Using Interactive Devices," the entirety of which is herein incorporated by reference.

BACKGROUND

This specification relates to interactive environments that connect network-enabled communication devices. Various types of devices, e.g., desktop computers and mobile phones, can communicate with one another using various data communication networks, e.g., the Internet.

A user study may be conducted by a variety of disciplines and generally involves observing users interacting with various things, e.g., products. Such studies are typically performed in a controlled environment, e.g., a laboratory.

Surveying generally refers to sampling by asking questions of individuals in a population for the purpose of computing statistics about trends or inclinations of the population.

SUMMARY

This specification describes how a system can provide a platform for conducting real-time, interactive, point-of-view user studies over a network, e.g. the Internet. Sponsors of the user studies can use such a system to identify study participants, who can be physically located anywhere in the world. The system can collect real-time video data of study participants interacting with products. Sponsors can also observe and interact in real time with study participants who are physically located at a particular site of interest.

In general, one innovative aspect of the subject matter described in this specification can be embodied in methods that include the actions of receiving a user study session request from a sponsor, wherein the user study session request identifies a product and one or more criteria; receiving session volunteer data identifying one or more available session volunteers having access to the product and one or more attributes; determining a session volunteer that satisfies the user study session request including matching the one or more attributes of the session volunteer to the one or more criteria of the session request; and initiating a session between the sponsor and the session volunteer. Other embodiments of this aspect include corresponding computer systems, apparatus, and computer programs recorded on one or more computer storage devices, each configured to perform the actions of the methods. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

The foregoing and other embodiments can each optionally include one or more of the following features, alone or in combination. Initiating a session between the sponsor and the session volunteer comprises providing, to the sponsor, point of view video data of the session volunteer interacting with the product. Providing, to the sponsor, point of view video data of the session volunteer interacting with the product comprises receiving video data from a session accessory associated with the session volunteer. Initiating a session between the sponsor and the session volunteer comprises providing, to the sponsor, real time video data of the session volunteer interacting with the product. Receiving session volunteer data identifying one or more available session volunteers having access to the product and one or more attributes comprises receiving session volunteer data in association with a purchase of the product. The actions include receiving audio data from the sponsor requesting a response from the session provider; providing the audio data to the session volunteer; receiving responsive data from the session volunteer that is responsive to the audio data; and providing the responsive data to the sponsor. The actions include providing an incentive to the session volunteer upon completion of the session.

In general, another innovative aspect of the subject matter described in this specification can be embodied in methods that include the actions of receiving an on-site session request from a session volunteer, wherein the on-site session request includes one or more attributes of the session volunteer; initiating an on-site session with the session volunteer; receiving on site session data from the session, including point of view video data of the session volunteer at the site from a wearable session accessory; and providing the received session data to a sponsor. Other embodiments of this aspect include corresponding computer systems, apparatus, and computer programs recorded on one or more computer storage devices, each configured to perform the actions of the methods.

The foregoing and other embodiments can each optionally include one or more of the following features, alone or in combination. Initiating an on-site session with the session volunteer comprises providing real time video data of the session volunteer at the site. The on-site session data includes location information describing one or more locations visited by the session volunteer during the session. The actions include receiving audio data from the sponsor requesting a response from the session volunteer; providing the audio data to the session volunteer; receiving responsive data from the session volunteer that is responsive to the audio data; and providing the responsive data to the sponsor. The actions include providing an incentive to the session volunteer upon completion of the session.

Particular embodiments of the subject matter described in this specification can be implemented so as to realize one or more of the following advantages. Session sponsors can conduct user product studies more easily and can obtain data on user interactions with products in the user's home or work environment, data that is otherwise difficult to obtain. Session sponsors can identify study participants who are physically located anywhere in the world. Session sponsors can conduct studies over the Internet. User study parameters can be quickly defined, and a user study can start immediately and at any time. This allows study sponsors to rapidly determine how their products are being used. Session sponsors can also conduct on-site studies to directly observe users navigating through facilities and interacting with objects at particular sites. User studies can be made interactive; for example, additional questions can be asked depending on the results of previous questions.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
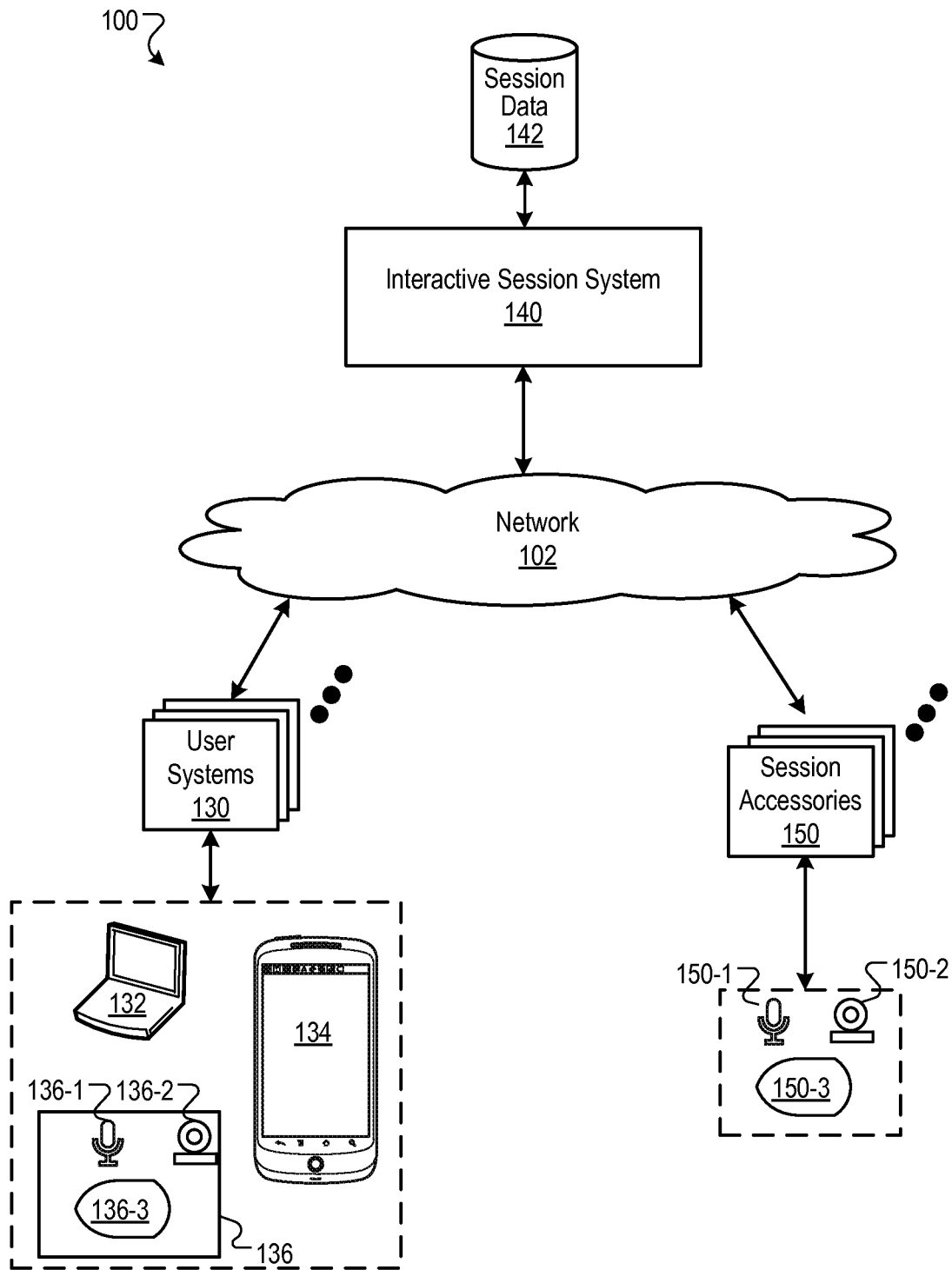
FIG. 1 is a block diagram of an example environment for acquiring data for conducting user product and on-site studies using network-enabled devices

FIG. 1 is a block diagram of an example environment 100 for acquiring data for conducting user product and on-site studies using network-enabled devices. A data communication network 102 enables data communication between multiple network-enabled electronic devices. Users can access content, provide content, exchange information, and participate in interactive sessions by use of the devices and systems that can communicate with each other over the network 102. The network 102 can include, for example, a local area network (LAN), a cellular phone network, a wide area network (WAN), e.g., the Internet, or a combination of them. The links on the network can be wireline or wireless links or both.

A user device 130 is an electronic device, or collection of devices, that is under the control of a user and is capable of requesting and receiving resources over the network 102. Example user systems 130 include personal computers 132, mobile communication devices 134, and other devices 136 that can send and receive data over the network 102. A user device 130 typically includes a user application, e.g., a web browser, that sends and receives data over the network 102, generally in response to user actions. The user application can enable a user to display and interact with text, images, videos, music and other content, which can be located on at a website on the World Wide Web or on a local area network.

A resource is any data that can be provided over the network 102 and that has a resource address, e.g., a uniform resource locator (URL). Resources may be HTML pages, electronic documents, images files, video files, audio files, and feed sources, to name just a few. The resources may include embedded information, e.g., meta information and hyperlinks, and/or embedded instructions, e.g., client-side scripts.

An interactive session system 140 is accessible by the user devices 130 over the network 102. The interactive session system 140 allows people to organize, request, and participate in sessions. In a session, a person interacts with another person or with a computer system, e.g., a software agent, which may be part of the interactive session system 140. For example, one person can use the interactive session system 140 to provide real-time video data to another person. In this context, "real-time" video data means that the sponsor observes only minimal appreciable delays due to processing limitations of the interactive session system 140. In some instances, the other person or system acts purely as an observer. In many instances, the other person or system plays an active role, and information goes in both directions during the session. For example, one person can ask the other person questions during the session, e.g. after observing video provided in the session. The term "session" may thus refer to such an interaction, the period of interaction, or a recording of such an interaction, as the context requires. Both a person and a system, e.g., a software agent, may be referred to as participants in a session. The participation of a system participant may be defined by a computer program or a script, which may be referred to as a session program or as the program of a session.

Events of different types can be experienced using the interactive session system 140. For example, users can interact with others during a session to ask questions about a particular task or using a particular product. Users can also observe others performing an activity, e.g., a volunteer navigating to a location within a supermarket. The interactive session system 140 may also provide sessions for other appropriate types of events.

Sponsors who desire to conduct a user study can use the interactive session system 140 to initiate sessions with volunteers. Although referred to as session "volunteers" for indicating their availability to participate in sessions, the session participants may receive some form of incentive or compensation for their participation. For example, sponsors can request sessions having particular parameters from the interactive session system 140. The interactive session system 140 will then endeavor to fulfill the session request by identifying one or more session volunteers as specified by the parameters of the requested session. For example, a sponsor can request a session that allows the sponsor to observe a session volunteer who is a male aged 18-34 using a power drill. The interactive session system 140 will then seek session volunteers who indicated that they are male, aged 18-34, and who own or have access to the requested power drill to fulfill the session request. Sponsors can use the session to observe and interact with session volunteers using products in their home or work environments.

In general, session accessories 150 are devices that can be used to initiate sessions with the interactive session system 140. Generally, a session accessory 150 is a system that includes one or more of an audio input device 150-1, a video input device 150-2, an optional display device 150-3, and optionally other input devices.

Session accessories 150 may range from full-room studios to simple hand-held video recording systems, although session accessories 150 will typically be portable, personal, multimode, e.g., audio and video, electronic devices. Session accessories 150 can also be wearable computing devices that include a camera input device and microphone input device and a wireless connection mechanism that may be worn on a user's person during the time the user is creating the session. For example, a session accessory can include a hat camera system that includes a camera mounted on the brim of a hat, which can connect wirelessly to a mobile computing system, e.g. a mobile phone. Session accessories can also include other camera systems worn by a person that provide point-of-view video data, for example a helmet-mounted camera.

Session accessories may also include devices that can be used to track eye movements or other devices that can be used to point or otherwise indicate to others viewing the session where the user of the session accessory is looking. For example, the session accessory can include a laser pointer device.

People who have session accessories 150, e.g., "session volunteers," can interact with interactive session system 140 to indicate their availability to participate in a session. The session volunteers can indicate a variety of parameters that the interactive session system 140 can use to fulfill session requests. For example, a male aged 18-34 can provide his gender and his age range along with an indication that he is available to provide a session for a session sponsor requesting a session with a session volunteer having those parameters.

Session requests and indications of session availability can be stored as sessions data 142. A session sponsor can use a user device 130 to access the interactive session system 140 to request a session. The interactive session system 140 can provide a user interface to the user devices 130 in which available session volunteers are arranged according to a topical hierarchy. In some implementations, the interactive session system 140 includes a search subsystem that allows sponsors to search for volunteers available to provide sessions.

When the interactive session system 140 finds a match between parameters of a session request by a session sponsor and parameters of an available session volunteer, the interactive session system can initiate a session between the sponsor and the session volunteer. A user, who may or may not be the sponsor, then experiences a session by use of one or more user devices 130. Other types of input and output devices may also be used, depending on the type of session. For example, an augmented reality visor that provides a view of a real-world environment augmented by computer-generated graphics may be used. A tactical sensory input device and a tactical sensory output device that applies pressure to a user's body and that the user interprets as simulated motion or other type of feedback may also be used.

In situations in which the systems discussed here collect personal information about users, or may make use of personal information, the users may be provided with an opportunity to control whether programs or features collect user information, e.g., information about a user's social network, social actions or activities, profession, a user's preferences, or a user's current location, or to control whether and/or how to receive content from the content server that may be more relevant to the user. In addition, certain data may be treated in one or more ways before it is stored or used, so that personally identifiable information is removed. For example, a session volunteer's identity may be treated so that no personally identifiable information can be determined by the sponsor and vice-versa, or a session volunteer's geographic location may be generalized where location information is obtained (such as to a city, ZIP code, or state level), so that a particular location of a session volunteer cannot be determined. Thus, the session volunteer may have control over how information is collected used by a content server.

Figure 2:
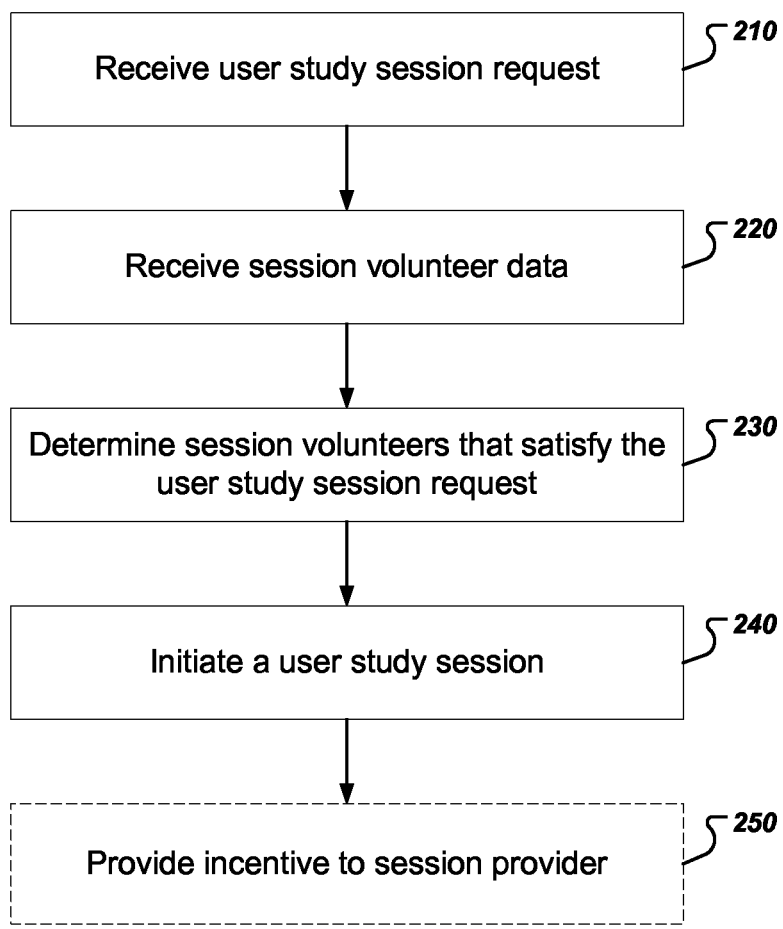
FIG. 2 is a flow chart of an example process for conducting a user product study.

FIG. 2 is a flow chart of an example process for conducting a user product study. In general, a sponsor can request a session from an interactive session system in order to conduct a user product study. The interactive session system can then locate matching session volunteers in order to fulfill the request. The sponsor, interactive session system, and session volunteers can communicate with one another using network software and protocols, e.g. over the Internet. The process will be described as being performed by a system of one or more computers, e.g., the interactive session system 140 of FIG. 1.

The system receives a user study session request (210). The system receives a session request from a session sponsor and generally includes one or more desired criteria for the session. In particular, for conducting a product study, the session request will include one or more criteria that identifies a particular product. For example, a sponsor may want to conduct user studies about how different age groups of people use a particular step ladder model. To do so, the sponsor can submit multiple session requests, each session request identifying the step ladder model and a particular age group. The session request can also include a particular incentive to be given to each session volunteer upon completion of the session.

The system receives session volunteer data (220). The session volunteer data generally indicates the availability of users having session accessories to provide sessions of users interacting with the desired product. Thus, the session volunteer data will generally include information about a product that is owned by or accessible to the session volunteer. The session volunteer data can include attributes of the session volunteer, for example, age, gender, geographic location, languages spoken, or other attributes.

In some implementations, a session volunteer can indicate his or her availability to provide sessions by accessing a web site of the interactive session system and signing up on the web site of the interactive session system.

User product study sponsors can also encourage potential volunteers to sign up to be session volunteers in connection with the purchase of a product. A study sponsor can offer a discount to a user purchasing a particular product if the user agrees to sign up to be a session volunteer for the product and agrees to enter a pool of potential session volunteers who can provide a user study session at some point in the future. For example, when a user purchases a barbeque grill, the user can receive a discount by signing up to be a session volunteer and agreeing to provide a user study session that includes a point-of-view session of the user operating the barbeque grill. Product study sponsors may also give or lend session accessories to users that purchase products as an incentive for signing up to be a session volunteer.

The system determines session volunteers that satisfy the user study session request (230). The system will use information about session volunteers in order to determine one or more session volunteers that match the session request. In general, a matching session volunteer will be a user having access to the particular product indicated in the session request as well as access to a session accessory. As described above, the system can maintain web pages listing available session volunteers and that also list outstanding session requests by session sponsors.

The system initiates a user study session (240). The system can for example initiate a session between the requesting sponsor and a matching session volunteer. The session volunteer can use a session accessory to provide real-time, point-of-view video data of the session volunteer using the product. For example, the session volunteer can use a wearable session accessory to provide a session that shows the session volunteer using a power tool in his garage. The session sponsor can then observe the session volunteer in real-time using the power tool in his garage. The session sponsor may learn, for example, that the tool is not safe, hard to use, is under-powered, etc. By observing the session volunteer in his or her own environment, the session sponsor may also learn that the session volunteer uses the power tool in a manner for which it was not intended or not designed. While the session accessories can be used to provide real-time sessions, the session sponsors can also record such data for later analysis, with the permission of the session volunteers.

The session sponsor can interact with the session volunteer throughout the session using written, visual, or audio commands or questions. For example, the session sponsor can ask the session volunteer to use the product to perform a particular task. For example, the session sponsor can tell the session volunteer, "Please make a loaf of wheat bread using your recently-purchased bread machine." The session sponsor can then observe the session volunteer in his or her home making a loaf of wheat bread using the bread machine being studied.

The interactive session allows the sponsor to ask questions that follow on other questions or that relate to what the volunteer is currently experiencing. For example, during a session, a session sponsor can endeavor to improve the product by directly finding out what is frustrating about a product instead of merely observing that the user is frustrated. For example, the session sponsor can observe the session volunteer appearing to be frustrated and can ask the user directly, "Please explain your frustration," or alternatively, "Please explain what you enjoy about the product."

By providing sessions between sponsors and session volunteers, the system provides a platform for sponsors to conduct user studies of people using products in their natural work or home environments in a way that is conventionally unavailable, difficult, or expensive to obtain. In particular, when using wearable point-of-view session accessories, session sponsors are able to observe users interacting with products from the user's viewpoint, rather than from a third person viewpoint or in a laboratory setting. This can be useful for conducting user studies of products for which seeing how the product is used may be difficult. For example, a session sponsor can observe a session volunteer using a remote control to control his or her own electronic equipment in her or her own home and from the session volunteer's perspective. The session sponsor can thus learn how the session volunteer actually uses or misuses the remote control in his or her home, information that can be used to redesign or otherwise improve the remote control.

In addition, the ability for session sponsors to directly interact with session volunteers allows the session sponsors to survey the session volunteers about various items. For example, the session sponsor can ask a session volunteer for his or her opinion on a variety of items. The session provider can use the session accessory to provide visual or audio data, such as colors, product designs, product logos, product jingles, or any other appropriate type of data for which feedback is desired. For example, the survey data can include two colors and the text, "Which color do you prefer?" Importantly, the session sponsor can ask for the session volunteer's opinion while the session volunteer is in his or her own home or work environment. Such opinions may be significantly influenced by context and may differ from consumer opinions obtained in a laboratory or in a public place such as a shopping mall.

The system optionally provides an incentive to the session volunteer (250). Upon successful completion of a session, the system can provide an incentive to the session volunteer, e.g. a rebate for a purchased product, a gift card, or some other reward.

Figure 3:
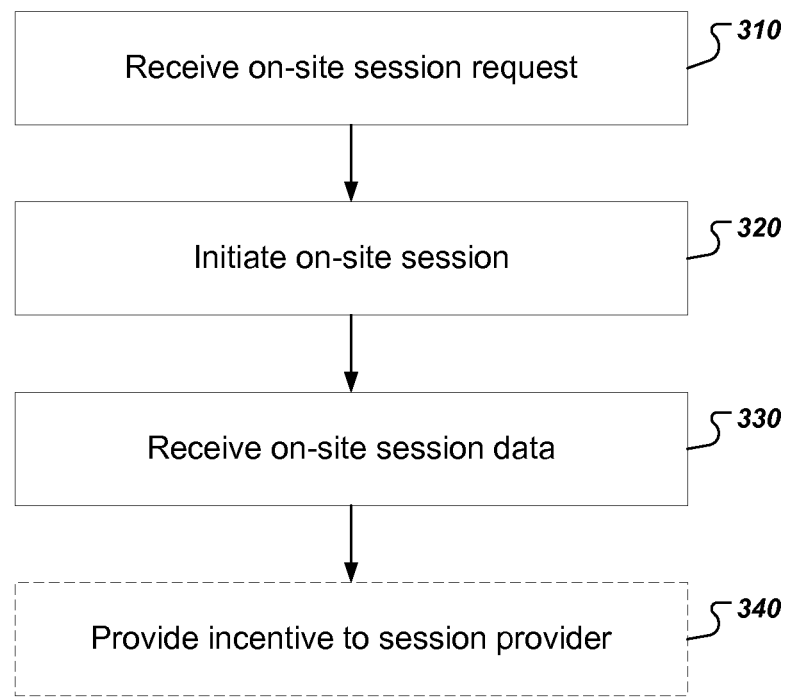
FIG. 3 is a flow chart of an example process for conducting an on-site user study.

FIG. 3 is a flow chart of an example process for conducting an on-site study. In general, a session sponsor can use an interactive session system to obtain real-time, point-of-view data of users moving through inside of facilities or other locations or data of interacting with or observing items at a particular site. Such data can be useful for assessing the layout, signage, or other attributes of a particular site and user interactions with or opinions about items located at the site. The process will be described as being performed by a system of one or more computers, e.g., the interactive session system 140 of FIG. 1.

The system receives an on-site session request (310). In the case of a session volunteer requesting an on-site user study, a study sponsor may temporarily lend wearable, point-of-view session accessories to people at the site or facility to be studied.

For example, a study sponsor may want to conduct an on-site user study in order to analyze the layout of a supermarket. To do so, the study sponsor could lend wearable session accessories to users who are selected, perhaps at random, as they enter the supermarket. The study sponsor could offer the users incentives for participating in the on-site study, e.g., a discount on purchases in the supermarket, cash, or store gift cards, for example. The study sponsor could also allow study volunteers to keep the session accessories upon successful completion of the on-site study as an added incentive. Users who agree to be session volunteers can be requested to provide one or more attributes personal attributes for the on-site session as requested by the session sponsor, e.g., the user's age, gender, income, etc.

The system initiates an on-site session (320). To initiate the on-site session, the session volunteer or session sponsor can activate the session accessory, which can communicate with an interactive session system to initiate the on-site session.

The session sponsor can then observe the session volunteer as the session volunteer interacts with the site or objects at the site. For example, the session sponsor can observe the session volunteer navigating inside of a supermarket. The session sponsor can observe the sections of the supermarket that the session volunteer visits as well as the order in which they are visited. The session sponsor can use such data to analyze the layout or signage of the supermarket.

The system receives session data (330). For example, the system can receive video data of the user navigating at the site recorded by a wearable session accessory. The session data can also include location data, e.g., GPS coordinates, of a session volunteer's movements at the site, e.g. movements inside a facility or a shopping mall. The system can then assemble trace data of the user's movements at the site for later analysis. Data recorded during the session can also be shared with others in real time or stored for later access and analysis by session sponsors.

The session sponsor can also interact with a session volunteer during the course of the on-site session. For example, the session sponsor can directly ask the session volunteer to try to find a particular area of a supermarket, a particular store in a shopping mall, or some other area of a facility in order to assess posted signage of the facility. The session sponsor can also directly ask the session volunteer questions about the experience of being at the site or about the experience of trying to find things at the site.

In addition, the session sponsor can survey session volunteers about various items located at the site. Surveying session volunteers on-site can allow the session sponsors to ask users about particular products that may be difficult to transport or see up close elsewhere, e.g. new car models. For example, a session sponsor can select a user entering a lot at a car dealership and select the user for an on-site study. To do so, the session sponsor can lend the newly-selected session volunteer a wearable a session accessory. Then, while the session volunteer is walking around the car dealership and viewing certain types of cars, the session sponsor can ask a session volunteer a variety of questions to gauge the session volunteer's opinion about the cars. For example, the session sponsor can ask a session volunteer which car model they prefer or which car color they prefer, all while the session volunteer is on site and experiencing the cars directly at the car dealership.

The system optionally provides an incentive to the session volunteer (340). Upon agreeing to provide or upon completing an on-site session, the system can provide the session volunteer an incentive. For example, the system can provide discount on purchases made during the on-site session. The system can also provide other incentives, for example, store credit, gift cards, or session accessories, for example.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory program carrier for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them. The computer storage medium is not, however, a propagated signal.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Computers suitable for the execution of a computer program include, by way of example, can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A computer-implemented method for initiating an interactive session between a sponsor and a session volunteer, the method comprising:
   receiving, by an interactive session system and from a user device of the sponsor, a user study session request that requests the interactive session system host an interactive user study session between the sponsor and at least one session volunteer that has access to a particular product for which a user study is to be conducted during the interactive user study session, wherein the user study session request identifies (i) the particular product for which the user study is to be conducted during the interactive user study session and (ii) one or more criteria;
   receiving, by the interactive session system, session volunteer data identifying (i) available session volunteers that each have a session accessory and, for each available session volunteer, (ii) one or more attributes of the available session volunteer and one or more products to which the available session volunteer has access prior to the user study session request being received, wherein the session accessory is a wearable computing device that includes a video camera input device and a wireless data connection mechanism that connects wirelessly to another computing system, and wherein the particular product is different from the session accessory;
   in response to receiving the user study session request:
      selecting, by the interactive session system and from the available session volunteers using the session volunteer data, a particular session volunteer to participate in the interactive user study session with the sponsor, the session volunteer data for the particular session volunteer indicating that the particular session volunteer satisfies the user study session request by having one or more attributes that match the one or more criteria identified by the user study session request and access to the particular product prior to the user study session request being received; and
      initiating, by the interactive session system, a user study session between the sponsor and the particular session volunteer by:
         providing, by the interactive session system and to the particular session volunteer, instructions to perform a particular task using the particular product;
         receiving, by the interactive session system and from the wireless data connection mechanism of the session accessory while the particular session volunteer wears the session accessory, session data including (i) point-of-view video of the particular session volunteer interacting with the particular product to perform the particular task and (ii) Global Positioning System (GPS) location information specifying GPS coordinates of at least one location visited by the particular session volunteer during the user study session; and
         providing, by the interactive session system and to the user device of the sponsor, video data that includes the point-of-view video of the particular session volunteer interacting with the particular product to perform the particular task.

2. The method of claim 1, wherein the video data comprises real-time video data of the particular session volunteer interacting with the particular product.

3. The method of claim 1, wherein receiving session volunteer data comprises receiving session volunteer data for a given session volunteer in response to the given session volunteer purchasing the particular product.

4. The method of claim 1, further comprising:
   receiving audio data from the sponsor requesting a response from the particular session volunteer;
   providing the audio data to the particular session volunteer;
   receiving responsive data from the particular session volunteer that is responsive to the audio data; and
   providing the responsive data to the user device of the sponsor.

5. The method of claim 1, further comprising:
   providing an incentive to the particular session volunteer upon completion of the user study session.

6. A system for initiating an interactive session between a sponsor and a session volunteer, the system comprising:
   one or more computers and one or more storage devices storing instructions that are operable, when executed by the one or more computers, to cause the one or more computers to perform operations comprising:
      receiving, from a user device of the sponsor, a user study session request that requests the one or more computers host an interactive user study session between the sponsor and at least one session volunteer that has access to a particular product for which a user study is to be conducted during the interactive user study session,
   wherein the user study session request identifies (i) the particular product for which the user study is to be conducted during the interactive user study session and (ii) one or more criteria;
receiving session volunteer data identifying (i) available session volunteers that each have a session accessory and, for each available session volunteer, (ii) one or more attributes of the available session volunteer and one or more products to which the available session volunteer has access prior to the user study session request being received,
   wherein the session accessory is a wearable computing device that includes a video camera input device and a wireless data connection mechanism that connects wirelessly to another computing system, and
   wherein the particular product is different from the session accessory;
in response to receiving the user study session request:
   selecting, from the available session volunteers using the session volunteer data, a particular session volunteer to participate in the interactive user study session with the sponsor, the session volunteer data for the particular session volunteer indicating that the particular session volunteer satisfies the user study session request by having one or more attributes that match the one or more criteria identified by the user study session request and access to the particular product prior to the user study session request being received; and
   initiating a user study session between the sponsor and the particular session volunteer by:
     providing, to the particular session volunteer, instructions to perform a particular task using the particular product;
     receiving, from the wireless data connection mechanism of the session accessory while the particular session volunteer wears the session accessory, session data including (i) point-of-view video of the particular session volunteer interacting with the particular product to perform the particular task and (ii) Global Positioning System (GPS) location information specifying GPS coordinates of at least one location visited by the particular session volunteer during the user study session; and
     providing, to the user device of the sponsor, video data that includes the point-of-view video of the particular session volunteer interacting with the particular product to perform the particular task.

7. The system of claim 6, wherein the video data comprises real-time video data of the particular session volunteer interacting with the particular product.

8. The system of claim 6, wherein receiving session volunteer data comprises receiving session volunteer data for a given session volunteer in response to the given session volunteer purchasing the particular product.

9. The system of claim 6, wherein the operations further comprise:
   receiving audio data from the sponsor requesting a response from the particular session volunteer;
   providing the audio data to the particular session volunteer;
   receiving responsive data from the particular session volunteer that is responsive to the audio data; and
   providing the responsive data to the user device of the sponsor.

10. The system of claim 6, wherein the operations further comprise:
   providing an incentive to the particular session volunteer upon completion of the user study session.

11. The method of claim 1, wherein the session accessory comprises a hat camera system that includes the video camera input device mounted on a brim of a hat.

12. The method of claim 1, wherein the session accessory includes a microphone input device.

13. The method of claim 1, wherein the session accessory includes a laser pointing device that indicates to the sponsor where the particular session volunteer is looking when wearing the session accessory.

14. The method of claim 1, wherein the particular session volunteer interacts with the particular product to perform the particular task at one of (i) a home environment of the particular session volunteer or (ii) a work environment of the particular session volunteer.

15. The method of claim 1, further comprising:
   providing, by the interactive session system and to the user device of the sponsor, location data that includes the GPS location information,
     wherein the user device uses the GPS location information to generate trace data specifying movements of the particular session volunteer throughout the user study session.

16. The system of claim 6, wherein the operations further comprise:
   providing, to the user device of the sponsor, location data that includes the GPS location information,
     wherein the user device uses the GPS location information to generate trace data specifying movements of the particular session volunteer throughout the user study session.

* * * * *